Dielectric constant response to frequencies for the system $\gamma\text{-}Al_2O_3/H_2O$
182,3 mg water per g $Al_2O_3$
+20° and +40°C tgδ - frequency-diagram of the system γ-$Al_2O_3$/$H_2O$
182.3 mg water/g
upper curve: +40°C
lower curve: +20°C

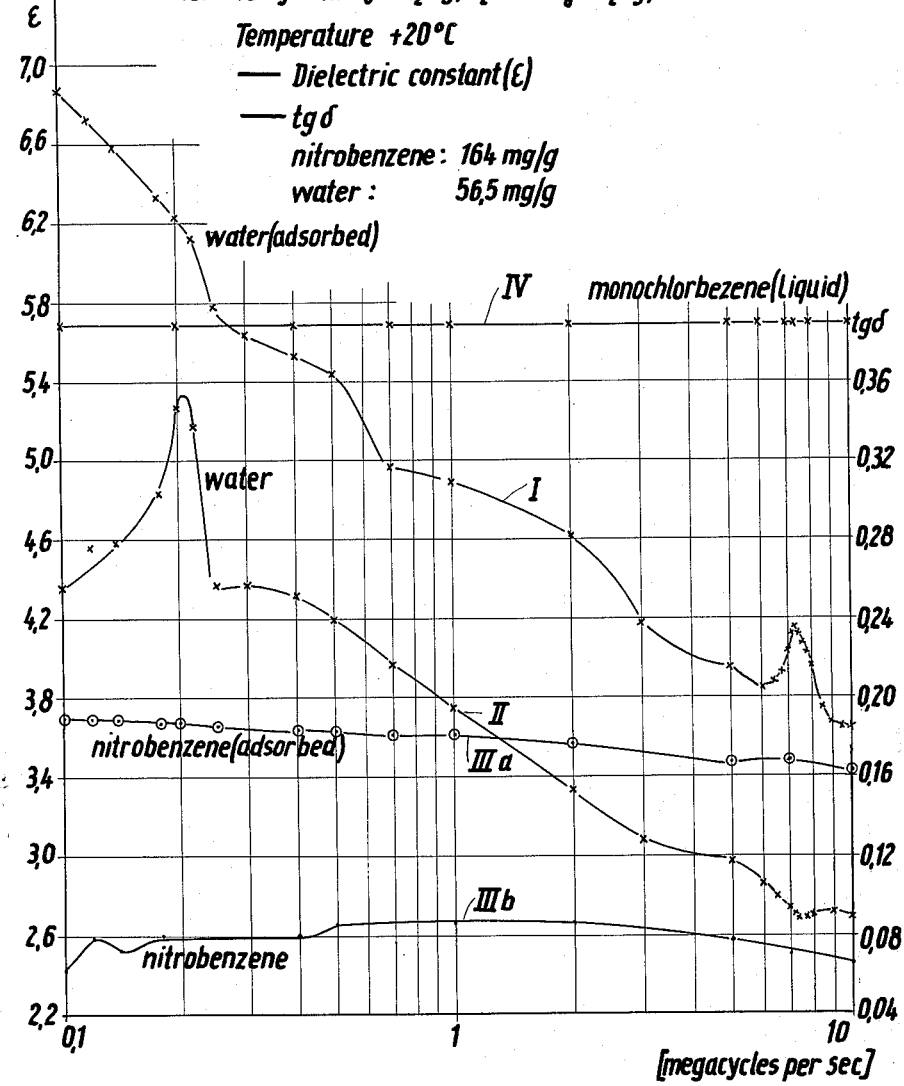

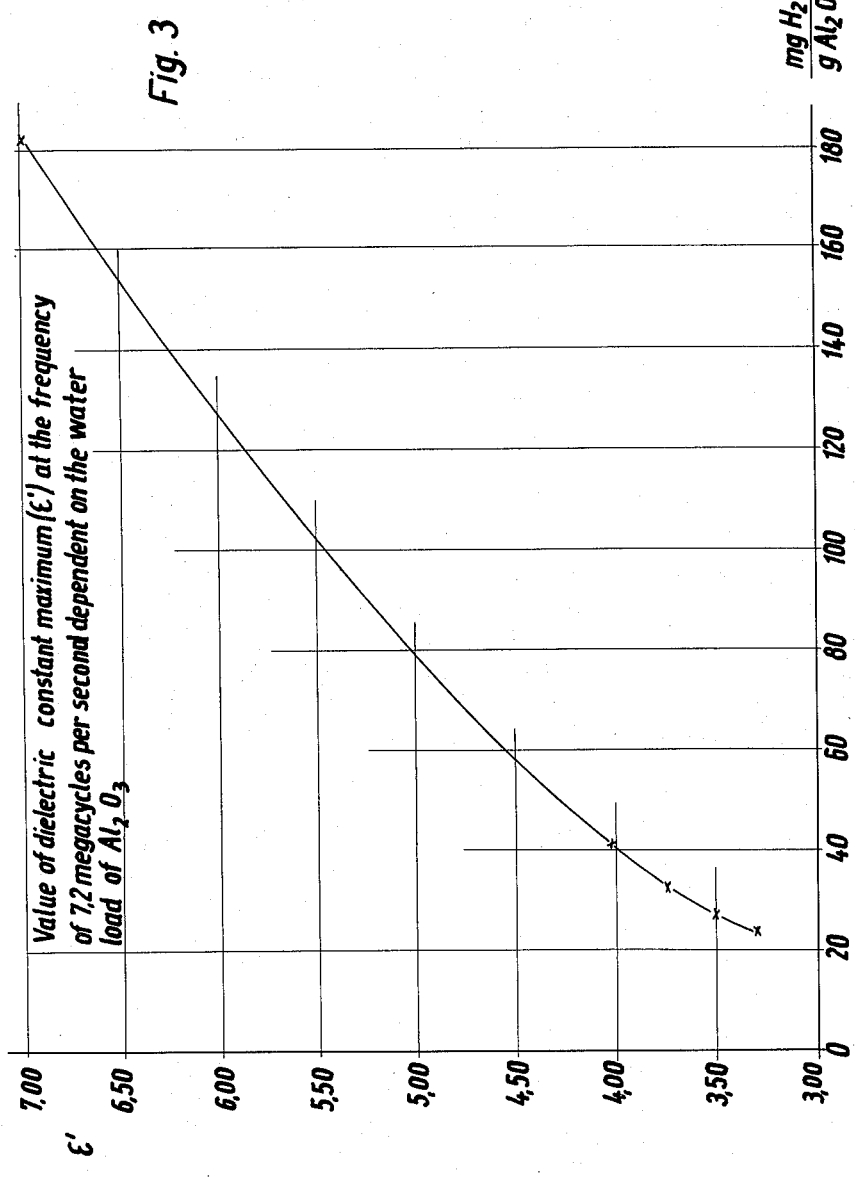

March 29, 1966 G. EBERT 3,243,674
CAPACITOR TYPE SENSING DEVICE
Filed Jan. 9, 1964 6 Sheets-Sheet 6

Inventor:

United States Patent Office 3,243,674
Patented Mar. 29, 1966

3,243,674
CAPACITOR TYPE SENSING DEVICE
Gotthold Ebert, Frankfurt am Main, Germany
Filed Jan. 9, 1964, Ser. No. 336,770
Claims priority, application Germany, Feb. 1, 1963,
E 24,279
15 Claims. (Cl. 317—246)

This invention relates to systems which consist of a solid designated generally as a "sorbent," and of one or more "sorptive" materials, and which serve as effective components of electric circuit elements that can be used, for instance, as a resonator, or as an element in resonant and other circuits for measuring purposes, e.g., for measuring the temperature and the humidity, respectively, and for similar purposes.

The sorbent in the present systems can consist of a pure substance or a mixture of chemically uniform materials. The term "sorption" and the terms derived therefrom incorporate "absorption," "adsorption" on surfaces, "capillary condensation" in micropores having a diameter of a few angstrom units up to about 500 angstrom units, "intracrystalline swelling" of materials having a laminate crystal structure, e.g., the bentonites, zeolites and similar minerals, and also "chemosorption."

Systems consisting of a surface-active material, e.g., coal, silica, alumina, and of a sorbed gaseous or liquid medium, e.g., water, benzene, sulphur dioxide etc., are known. In such systems, the gas or liquid is held upon a largely extended surface formed by a plurality of particles in the form of a layer, the thickness of which can be fairly great, but can also be of only one molecular diameter and less. The condition of a medium liquid under normal conditions, but which is in form of a layer having a thickness of a few atomic diameters, must be regarded as indefinite, because normal characteristics of a liquid cannot be found in layers of such small thickness. Therefore, no difference is made between the liquid and gaseous condition of the sorbed fluids in the following description.

In high frequency technique, a plurality of electrically insulating materials are known, the relative dielectric constants of which mostly decrease with increasing frequency of an A.C. field applied thereto; in this connection, it may be remarked that a maximum value of the dielectric losses is associated with each decrease of the dielectric constant. The relative dielectric constant of some materials, e.g., mineral wax, such as ceresin, ozocerite, has a value of about 3 up to 7 at a frequency of 1 megacycle per second, and the value is only 2.2 at a frequency of 50 cycles per second. A similar increase of the dielectric constant with increasing frequency is also found in some phenoplasts containing an inorganic filler for molding purposes, and also in fibrous materials, such as insulating paper in dry condition, and in polyester resins for casting purposes, e.g., leguval, laminac, in an unfilled and unset condition, in as far as the values measured at a frequency of 50 cycles per second are compared with those measured at 800 cycles per second. In the cases mentioned previously, the dielectric losses, however, increase simultaneously with increasing dielectric constant.

The dielectric losses are generally known as the energy losses within a dielectric material which are not caused by the insulating resistance which can commonly be measured by a D.C. current. Besides polarization, there occurs an orientation of the atomic and molecular dipoles which can be in the present dielectric material, an orientation of the electric charges on the surfaces limiting inhomogeneous areas and/or a translatory movement of sliding ions in an electric field. Thus, phenomena occur, all of which dissipate energy, when an electric A.C. field is applied to the dielectric material.

Liquid dielectric materials are also known, the dielectric constants of which are constant up to frequencies of 100 megacycles per second, and the dielectric losses of which decrease up to the frequencies of 1,000 or 10,000 cycles per second, remain constant in the subsequent range up to 0.1 or 1 megacycle per second, and again increase at higher frequencies. Good mineral oil, good synthetic oil, hexachlorobutadiene (tripene), and silicone oil, for instance, belong to the materials described above.

On the other hand, there are also solids, the dielectric constants of which vary very greatly within a temperature range from −20° C. up to about +120° C., whereby a maximum value occurs at about +10° C., and a second maximum value lies near +120° C. A material of said type is e.g., ceramic barium titanate, the dielectric constant of which increases to above 1,600 at about +10° C. from about 900 at −20° C. and then up to about 4,000 at a temperature of about +120° C. Other titanate ceramics have a similar characteristic response of the dielectric constant dependent on temperature alterations.

An object of the invention is the production and provision of systems, the dielectric constant of each of which increases steeply up to a maximum value and then steeply decreases down to a value which lies in the order of the values before rising steeply at the lower or greater frequencies, within a very small frequency band, wherein a distinct minimum value of the dielectric losses is associated with the said maximum value of the dielectric constant.

It is a further object of the invention to utilize any resonant phenomena of the medium sorbed on the surface of the sorbent, which are unknown up to now and are related to the temperatures of both components.

For producing such systems according to the invention, a fluid which has at least one OH— group, and which can be sorbed, is added to a surface-active dielectric material which is packed in a closed vessel with constant density and of a quantity such that a layer results on the surface of the dielectric material, the thickness of which layer can be less than monomolecular, but also monomolecular or multimolecular, respectively. The maximum thickness of the layer of the sorptive fluid is nearly determined by the fact that the relative vapor pressure of the sorptive fluid must be lower than the vapor pressure of the pure liquid in the closed chamber or vessel. The maximum thickness of the layer can also be determined by the diameter of the pores of the sorbent, which lies in the range up to some hundred angstrom units for a plurality of surface-active materials.

The monomolecular coating of the sorbent must not be complete. It is however, of importance that "chemosorption" is excluded, although it is likewise incorporated in the term "sorption." "Chemosorption" embodies such actions or reactions in which the differential sorption heat exceeds the amounts of about 20 kcals. per mol. The lower limit for the thickness of the sorptive layer upon the sorbent is also defined by the statement of the said energy value, because the first molecules which impinge the sorbent are commonly subjected to "chemosorption."

For producing systems according to the invention which serve as an effective component for an electrical circuit element which is, for instance, applicable as a resonator, or for measurements in resonant circuits operated by electric waves or in circuits for measuring the temperature or humidity, a quantity of a liquid or gaseous medium, i.e., a fluid, having at least one OH— group is so added to a surface-active dielectric material packed homogeneously within a closed vessel between two electrodes that a layer occurs on the surface of the dielectric material which is less than monomolecular or is monomolecular or multimolecular, respectively.

In one embodiment of the invention, the vessel can be a thin-walled cylinder of an insulating material, on the internal surface of which is applied a conductive (metallic) coating as the one electrode, an axially extending metal wire or a coaxial cylindrical metal member forming the other electrode, between which pair of electrodes the system of the invention is embedded, so that the whole structure presents an electrical high frequency circuit element. The high frequency circuit element can be used as a resonator, and for measuring the temperature and moisture, respectively, depending on the type of connected or coupled circuit.

The above and other objects and features of this invention will be appreciated more fully from the following detailed description when read with reference to the accompanying drawings wherein:

FIG. 1 is a diagram in which the dielectric constant and the dielectric losses of a system embodying the invention, one component of which contains a OH— group, are plotted in a wide frequency range of an applied A.C. field, compared with a system in which nitrobenzene is used instead of the component having the OH— group, showing only one distinct maximum value of the dielectric constant for the component having the OH— group;

FIG. 3 is a diagram which shows the dependency of the maximum dielectric constant on charging the sorbent with the sorptive;

Figure 2A:
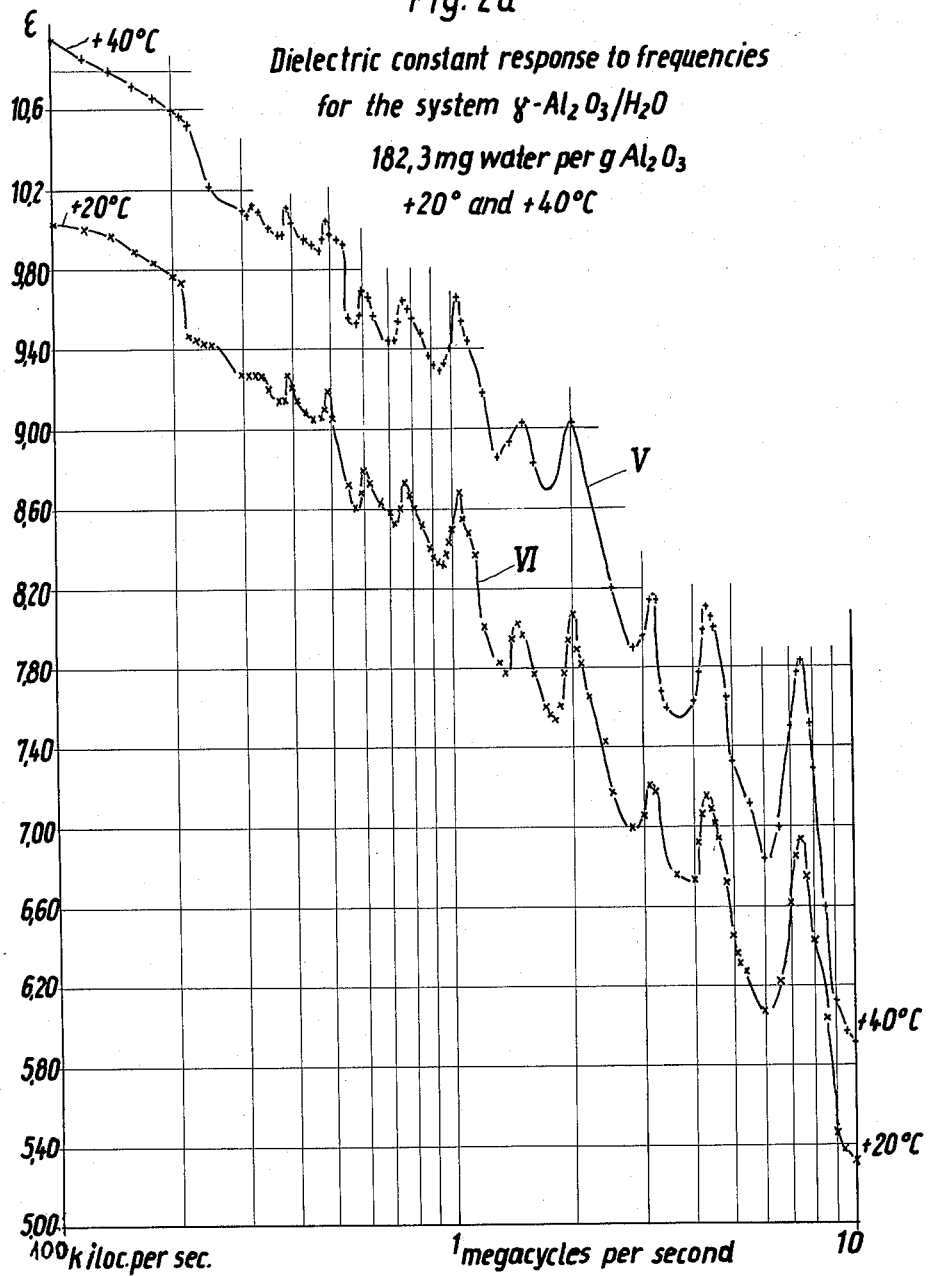
FIGS. 2a and 2b are diagrams which show the temperature response of the maxima of the dielectric constants and the dielectric losses associated therewith.

As shown by FIG. 1, the frequency of an applied A.C. field is plotted in a logarithmic scale along the abscissa, and the dielectric constant and the dielectric losses (tan δ), respectively, are plotted in a linear scale along the ordinate axis. The upper full curve I indicates the relative dielectric constant of a system, the composition of which is hereinafter disclosed in detail. The curve I shows the usual decrease of the dielectric constant to a value of 3.85 at a frequency of 6 megacycles per second from a value of 6.8 at a frequency of 0.1 megacycle per second, i.e., with increasing frequency. In the frequency range above 9 megacycles per second, the dielectric constant decreases continuously with nearly the same slope as up to 6 megacycles per second from low frequencies. In the frequency range between 6 and 9 megacycles per second, the dielectric constant reaches an unexpected maximum value of 4.1 at a frequency of 7.3 megacycles per second. Further peaks, tops and maximum values which can only be resolved or determined with difficulties, are neglected.

The lower full curve II indicates the dielectric losses (tan δ) of the same system the values of which are associated with the values of the dielectric constant at the same frequencies and decrease also in a wide frequency range. The left side maximum of the dielectric losses at a frequency of 0.2 megacycle per second can be associated with the decrease of the dielectric constant between 200 and 350 kilocycles per second. The shallow minimum value of the dielectric losses in the frequency range of 6 to 9 megacycles per second is of importance; it clearly discloses the connection with the maximum value of the dielectric constant in the said frequency range, shown in the diagram.

Both full curves I and II are obtained from a system in which 56.5 mgrs. water per 1 gr. $\gamma$-$Al_2O_3$ are sorbed, which sorbent is of a powdered and surface-active condition homogeneously packed and has a specific surface of 72 sq. ms. per gram. For producing a monomolecular water layer, 24 mgrs. water are normally required for an aluminum oxide surface of an area of 100 sq. ms., so that 3 to 4 molecular layers water are sorbed on the surface of the aluminum oxide in the system used for FIG. 1. The said sorbed water mainly of the first and second molecular layer cannot be considered as the normal liquid water, but its responses come considerably nearer to ice from the molecular-dynamic viewpoint. This results from nuclear resonant experiments and from the response of the temperature coefficient of the dielectric constant.

As shown in FIG. 1, furthermore a curve IIIa of the dielectric constant is plotted in the whole frequency range for a system, which contains nitrobenzene without any OH— group (charging 164 mgrs. per gr. $Al_2O_3$) in place of the water containing one OH— group; it can be recognized that chemical compounds having no OH— groups and which are sorbed on the surface of the aluminum oxide in a similar manner, have no characteristic maxima or peaks in small frequency bands. The curve IIIb indicates the course of the dielectric losses of the same system in the same frequency range.

In FIG. 1, the values of the dielectric constant measured with liquid chlorobenzene and obtained by the same apparatus, are additionally plotted (curve IV); as it can be expected, these values are constant in the chosen frequency range and thus result in a line parallel to the abscissa. By this fact it is proved that the observed resonance phenomena which are due to a distinct maximum of the dielectric constant in a small frequency band are not based on apparatus effects, but are caused in fact by the sorbed substance containing the OH— group.

FIG. 2a represents the dependency of such maxima of the dielectric constant on the temperature, based on the said resonance phenomena in the system. In this case, 182 mgrs. water, however, are added to one gram $Al_2O_3$, i.e., somewhat more than three times compared with Example I of FIG. 1. The upper curve V discloses the course of the dielectric constant dependent on the frequency at the temperature of +40° C., and the lower curve VI indicates the same dependency at the temperature of +20° C.

Although only distinct maxima of the dielectric constant of the described system between 100 kilocycles per second and 10 megacycles per second are disclosed in FIG. 2a, i.e., such maxima which can easily be resolved by the measuring apparatus, there can be further maxima and peaks in the adjacent frequency ranges (not shown), whereby frequencies up to the microwave range and down to about 1 kilocycle per second must be considered.

Figure 2B:
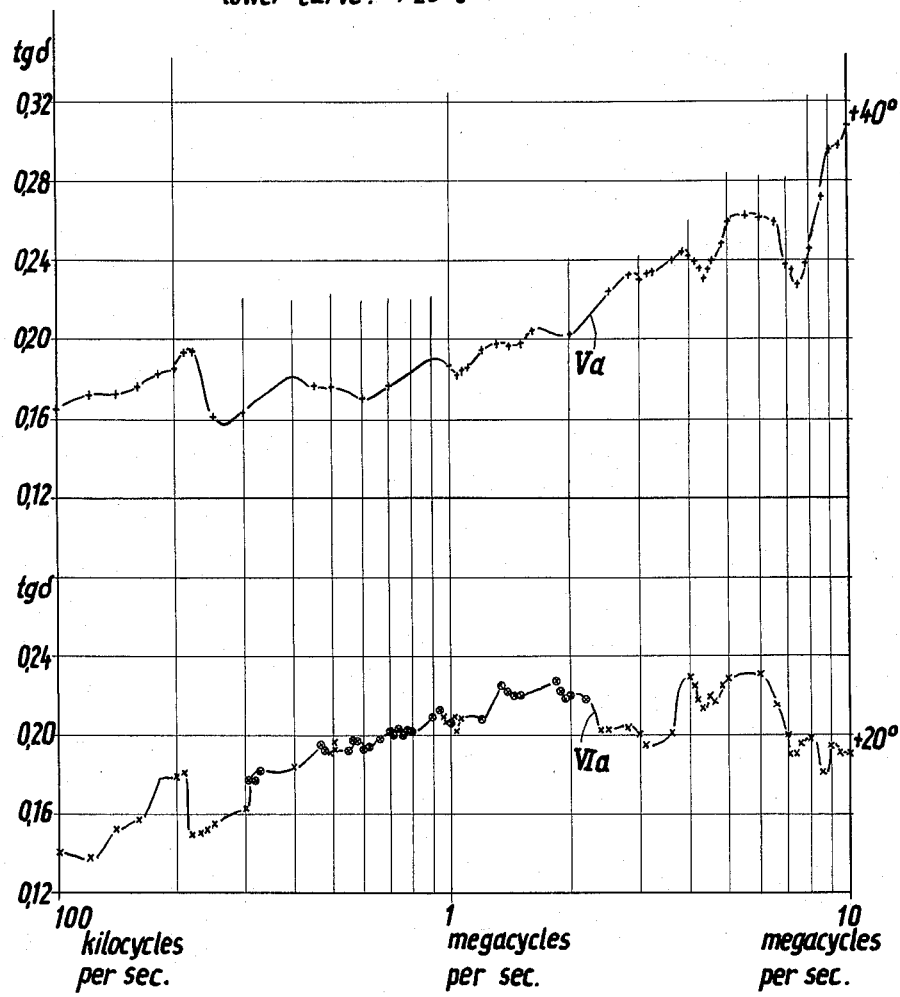

FIG. 2b shows the temperature response of the dielectric losses of the system, from which the readings are made according to FIG. 2a. The upper curve Va indicates the values measured at a temperature of +40° C., and the lower curve VIa shows the readings from the same system at the temperature of +20° C. When comparing FIGS. 2b and 2a, along abscissa of which the same frequency range is plotted, it can be recognized that each minimum value of the dielectric losses is associated to a distinct maximum value of the dielectric constant.

In the same way as in FIG. 2a, the curve of the dielectric constant in a given frequency range or band is shifted substantially parallel along the ordinate axis to greater and smaller values, respectively, in response to a temperature change; a distinct maximum value of the dielectric constant at a predetermined frequency has a distinct displacement, when the charge of the sorbent with the sorptive is altered.

As shown in FIG. 3, there is disclosed the dependency of the level of one maximum value of the dielectric constant at a frequency of 7.2 megacycles on water charging the aluminum oxide. The values of the dielectric constant from 3 to 7 are plotted along the ordinate axis, and the water charges up to 200 mgrs. per one gr. $Al_2O_3$ are plotted along the abscissa.

Figure 4:
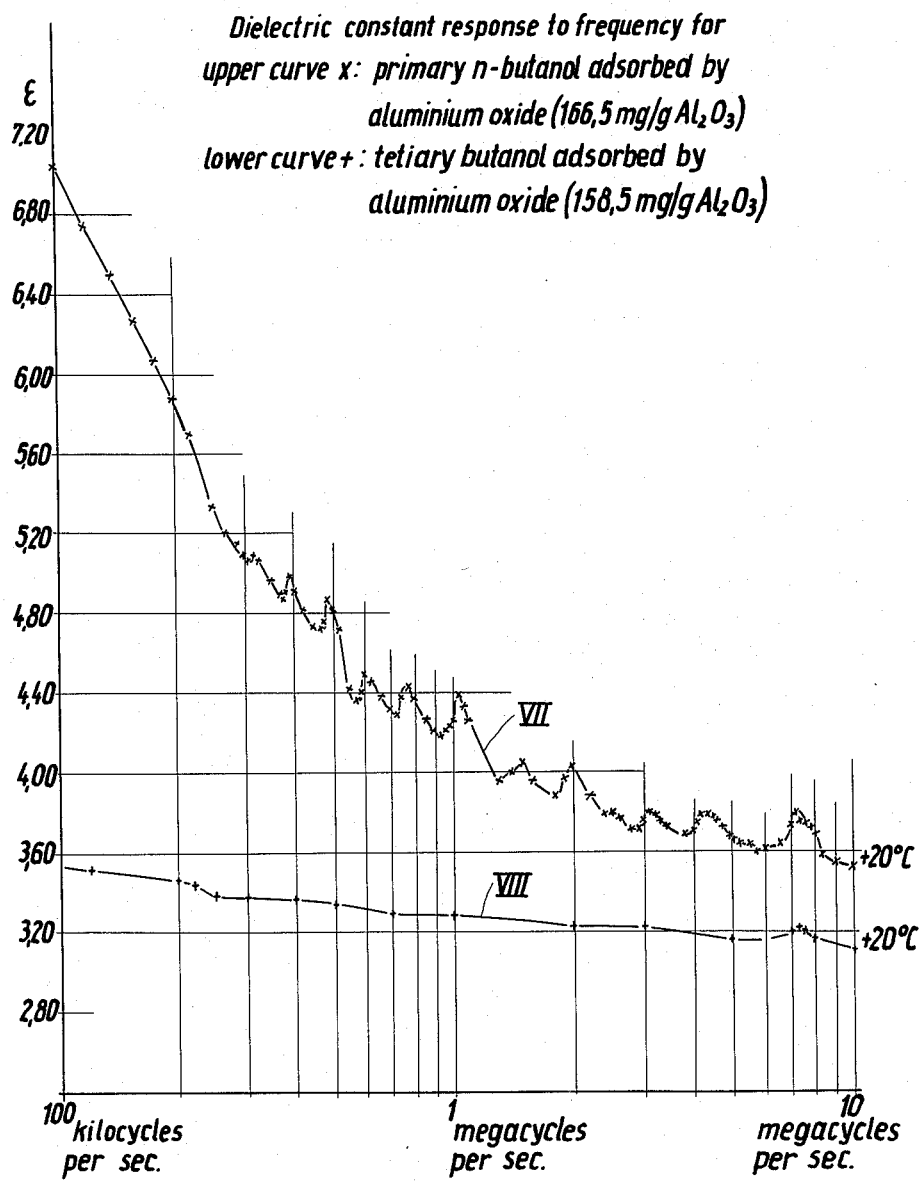
FIG. 4 is a diagram which shows the dependency of the distinct maxima of the dielectric constant on the intramolecular bonding of the OH— group of the sorptive.

FIG. 4 shows that the distinct maxima of the dielectric constant are dependent on the presence and the type of chemical bonding of the OH— group in the respective molecule of the sorptive. The upper curve VII is taken from a system which uses primary n-butanol as the sorptive and the lower curve is measured by means of ternary butanol as the sorptive. For both curves, aluminum oxide is chosen as the sorbent; the charges of the sorbents have the same order of magnitude, namely 166.5 mgrs. per gram $Al_2O_3$ for the curve VII, and 158.5 mgrs. per gr. aluminum oxide for the curve VIII.

The curve VIII contains only a shallow maximum value of the dielectric constant at about 7.2 megacycles per second, and the curve VII shows the distinct characteristic maximum value for the same frequency. This phenomenon is due to the fact that the OH— group in the molecule of the primary n-butanol is enclosed much less than in the molecule of the ternary butanol. As a result of the greater freedom of the OH— group in the primary n-butanol, the said OH— group can be more effective within the system in an electrical respect.

Figure 5:
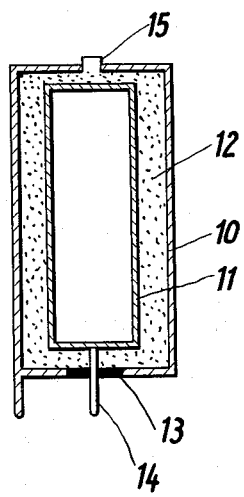
FIG. 5 shows the structure of an electrical circuit element containing the system according to the invention, schematically.

In FIG. 5, there is shown the structure of an electric circuit element containing a system as described above. The element incorporates a conductive outer electrode 10 which is insulated, if desired, and which forms a cover for the closed vessel. An inner electrode 11 of the same shape, but of decreased dimensions is spaced from the outer electrode 10. The system 12 according to the invention is homogeneously packed with constant density in the space between the two electrodes 10 and 11. A lead 14 is passed to the inner electrode 11 through the outer electrode 10 by means of an insulating member 13.

For producing such circuit element, the sorbent, e.g., very pure aluminum oxide, is dehydrated in a furnace and dried in a vacuum at a temperature of 300° C., until a decrease of weight cannot be observed. The sorbent treated in said manner is filled through an opening 15 into the space between the electrodes within an inert atmosphere. Subsequently, a chamber filled with dry air and a desiccator, e.g., phosphorus penta oxide, is set on the filling opening 15 and sealed therewith in air-tight manner. Simultaneous with the removal of the drying means from the casing or chamber, a measured amount of the sorptive containing the OH— group, e.g., water, is introduced to the sorbent by means of a measuring device; the water evaporates for one day and is uniformly distributed in the sorbent. To achieve a constant packing of the sorbent before the water is filled in, it is convenient to shake it in the space between the electrodes, until the electrical capacity of the circuit element has reached a constant value and maintains it. It can be seen from reproducible measuring results that the sorptive is uniformly distributed within the sorbent.

The surface-active dielectric material, i.e., the sorbent, can be microporous or very finely divided substances, such as aluminum oxide, preferably $\gamma=Al_2O_3$, silicon dioxide, preferably silica gel having small or wide pores, or a sodium aluminum silicate, e.g., zeolith. The fluid having at least one OH— group, i.e., the sorptive, can be polar compounds, particularly water, and hydroxy-compounds having one or more valencies, such as methanol or primary butanol.

For measuring the humidity, the opening 15 is connected to another chamber, the moisture content of which is to be measured. Although the circuit element has an inherent inertia for this type of measurement, which is due to the slow distribution of the water in the compact batch of the sorbent, the circuit element according to the invention is advantageously suitable for determinations of vapor concentrations, which are caused by different chemical substances containing one or more OH— groups rather than by water; the determination of which substances can be very difficult because of their inherent activity and mobility. Then, the unfavorable factor, i.e., time can be neglected, if the desired measurements can be performed at all. In technological processes or chemical conversions in which a material containing at least one OH— group is released, the concentration of the material can be measured or checked in its gaseous or liquid condition. The content of alcohol can easily be measured from a mixture of acetone, methanol, butanol or similar alcohols by means of the device for measuring the moisture according to the invention. The device can also be used as a scanning element for a controller, dependent on the type of the circuit connected thereto.

Accordingly, the electrical circuit element is useful, as a frequency stabilizer, as a resonator, or as an element for measuring the temperature or humidity, dependent on the electric circuit connected thereto, and is applicable in the form of a measuring or scanning element, and is used for a controller of water vapor, methanol, ethanol, butanol, etc. in steam or gas mixtures.

It is to be understood that the above description is illustrative of this invention and that various modifications thereof can be utilized without departing from its spirit and scope.

Having described the invention, I claim:

1. A capacitor-like circuit element for detecting small frequency variations of an A.C. field applied thereto at a frequency above 1000 cycles per second, as the result of a high frequency response of the dielectric constant, comprising an enclosure, at least two electrodes associated with said enclosure, a surface-active, microporous, very finely divided dielectric material packed in said enclosure as a sorbent, and a fluid having at least one OH— group added as a sorptive to the dielectric material in an amount to produce a layer of not more than a few diameters of a molecule in thickness on the surface of the dielectric material.

2. A capacitor-like circuit element for detecting small amounts of a fluid having at least one OH— group in the molecule, as the result of a high frequency response of the dielectric constant, comprising an enclosure having an aperture for introducing said fluid, at least two electrodes associated with said enclosure and supplied with an A.C. field at a frequency above 1000 cycles per second, a surface-active, microporous, very finely divided dielectric material packed in said enclosure as a sorbent to which the fluid to be detected is supplied as a sorptive in an amount to produce a layer of not more than a few diameters of a molecule in thickness on the surface of the dielectric material.

3. A capacitor-like circuit element for detecting small temperature variations as the result of a high frequency response of the dielectric constant, comprising an enclosure, at least two electrodes associated with said enclosure and supplied with an A.C. field at a frequency above 1000 cycles per second, a surface-active, microporous, very finely divided dielectric material packed in said enclosure as a sorbent, and a fluid having at least one OH— group added as a sorptive to the dielectric material in an amount to produce a layer of not more than a few diameters of a molecule in thickness on the surface of the dielectric material.

4. A circuit element according to claim 1 wherein the sorbent is homogeneously packed.

5. A circuit element according to claim 2 wherein the sorbent is homogeneously packed.

6. A circuit element according to claim 3 wherein the sorbent is homogeneously packed.

7. A circuit element according to claim 1 wherein the layer of the sorptive on the surface of the sorbent is of less than monomolecular thickness.

8. A circuit element according to claim 2 wherein the sorptive is supplied in an amount to produce a layer on the surface of the sorbent, the thickness of which layer is less than monomolecular.

9. A circuit element according to claim 3 wherein the layer of the sorptive on the surface of the sorbent is of less than monomolecular thickness.

10. A circuit element according to claim 1 wherein the fluid is a polar hydroxy compound selected from the class consisting of water, univalent alcohols, bivalent alcohols and polyvalent alcohols.

11. A circuit element according to claim 2 wherein the fluid to be detected is a polar hydroxy compound selected from the class consisting of water, univalent alcohols, bivalent alcohols and polyvalent alcohols.

12. A circuit element according to claim 3 wherein the fluid is a polar hydroxy compound selected from the class consisting of water, univalent alcohols, bivalent alcohols and polyvalent alcohols.

13. A circuit element according to claim 1 wherein the sorbent is an inorganic compound selected from the class consisting of aluminum oxide, silicon dioxide and sodium aluminum silicate.

14. A circuit element according to claim 2 wherein the sorbent is an inorganic compound selected from the class consisting of aluminum oxide, silicon dioxide and sodium aluminum silicate.

15. A circuit element according to claim 3 wherein the sorbent is an inorganic compound selected from the class consisting of aluminum oxide, silicon dioxide and sodium aluminum silicate.

References Cited by the Examiner

UNITED STATES PATENTS

| | | | |
|---|---|---|---|
| 2,377,426 | 6/1945 | Kersten | 324—65 X |
| 2,759,147 | 8/1956 | Stein | 317—246 X |
| 3,022,667 | 2/1962 | Wexler | 73—336.5 |
| 3,083,573 | 4/1963 | Shaw | 73—336.5 |
| 3,148,314 | 9/1964 | Ponemon | 317—246 |

FOREIGN PATENTS 663,522   4/1963   Canada.

ROBERT K. SCHAEFER, *Primary Examiner.*

JOHN F. BURNS, *Examiner.*

E. GOLDBERG, *Assistant Examiner.*